(12) United States Patent
Chen et al.

(10) Patent No.: US 11,757,576 B2
(45) Date of Patent: Sep. 12, 2023

(54) TRANSMISSION METHODS AND DEVICES

(71) Applicant: VIVO MOBILE COMMUNICATION CO., LTD., Guangdong (CN)

(72) Inventors: Xiaohang Chen, Chang'an Dongguan (CN); Xueming Pan, Chang'an Dongguan (CN); Zhi Lu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 208 days.

(21) Appl. No.: 16/968,842

(22) PCT Filed: Jan. 16, 2019

(86) PCT No.: PCT/CN2019/071865
§ 371 (c)(1),
(2) Date: Aug. 10, 2020

(87) PCT Pub. No.: WO2019/154030
PCT Pub. Date: Aug. 15, 2019

(65) Prior Publication Data
US 2021/0021385 A1 Jan. 21, 2021

(30) Foreign Application Priority Data
Feb. 11, 2018 (CN) .......................... 201810143339.5

(51) Int. Cl.
*H04L 1/18* (2023.01)
*H04W 72/14* (2009.01)
(Continued)

(52) U.S. Cl.
CPC .......... *H04L 1/1819* (2013.01); *H04L 1/1854* (2013.01); *H04W 72/21* (2023.01); *H04W 72/23* (2023.01); *H04W 72/566* (2023.01)

(58) Field of Classification Search
None
See application file for complete search history.

(56) References Cited

U.S. PATENT DOCUMENTS

2019/0075589 A1* 3/2019 Jeon ...................... H04L 1/1819
2019/0207737 A1* 7/2019 Babaei .................. H04L 5/0098
(Continued)

FOREIGN PATENT DOCUMENTS

| CN | 101615988 A | 12/2009 |
|---|---|---|
| CN | 103313254 A | 9/2013 |

OTHER PUBLICATIONS

Catt, "UE behavior on configured grant timer upon DCI reception", Jan. 26-27, 2018, 3GPP TSG-RAN WG2 NR AH-1801, pp. 1-6 (Year: 2018).*

(Continued)

*Primary Examiner* — Steve R Young
(74) *Attorney, Agent, or Firm* — Maschoff Brennan

(57) ABSTRACT

The present disclosure in some embodiments provides a transmission method and a transmission device. The transmission method includes, in a case that a same first HARQ process is used by a dynamic-grant PUSCH and a configured-grant PUSCH, transmitting one of the configured-grant PUSCH and the dynamic-grant PUSCH using the first HARQ process, or transmitting the configured-grant PUSCH or the dynamic-grant PUSCH using the first HARQ process and then transmitting the dynamic-grant PUSCH or the configured-grant PUSCH using the first HARQ process.

10 Claims, 6 Drawing Sheets

(51) Int. Cl.
*H04W 72/12* (2023.01)
*H04L 1/1812* (2023.01)
*H04L 1/1829* (2023.01)
*H04W 72/21* (2023.01)
*H04W 72/23* (2023.01)
*H04W 72/566* (2023.01)

(56) References Cited

U.S. PATENT DOCUMENTS

| | | | |
|---|---|---|---|
| 2019/0215862 A1* | 7/2019 | Kim | H04W 74/006 |
| 2020/0045722 A1* | 2/2020 | Bae | H04W 72/1284 |
| 2020/0053749 A1* | 2/2020 | Liu | H04W 72/23 |
| 2020/0154469 A1* | 5/2020 | Chin | H04W 72/0446 |
| 2021/0014886 A1* | 1/2021 | Lee | H04L 1/18 |

OTHER PUBLICATIONS

EP Search Report in Application No. 19750576.1 dated Mar. 9, 2021.
"Discussion on behaviour of ConfiguredGrantTimer", 3GPP TSG-RAN2 Meeting AH#1, R2-1800155, Jan. 22, 2018.
"UE behaviour on configured grant timer upon DCI reception" 3GPP TSG-RAN WG2 NR AH-1801, R2-1800165, Jan. 27, 2018.
CN Office Action in Application No. 201810143339.5 dated Apr. 29, 2020.
CN Office Action in Application No. 201810143339.5 dated Nov. 30, 2020.
"HARQ Process Sharing for NR" 3GPP TSG-RAN WG2 NR Ad-hoc 1801, Jan. 22, 2018.
"CR on HARQ Processing Sharing for NR (Alternative 2)" Change Request, 3GPP TSG-RAN WG2 NR Ad-hoc 1801, Jan. 22, 20218.

* cited by examiner

TRANSMISSION METHODS AND DEVICES

CROSS-REFERENCE TO RELATED APPLICATION

The present application claims a priority of the Chinese patent application No. 201810143339.5 filed on Feb. 11, 2018, which is incorporated herein by reference in its entirety.

TECHNICAL FIELD

The present disclosure relates to the field of communications technology, in particular to transmission methods and transmission devices.

BACKGROUND

As compared with a previous mobile communications system, a coming Fifth-generation (5G) mobile communications system needs to be adapted to more diversified scenarios and service requirements. Principal scenarios of new radio (New Radio, NR) includes enhanced mobile broadband (Enhanced Mobile Broadband, eMBB), massive machine type of communication (massive Machine Type of Communication, mMTC) and ultra-reliable & low latency communication (Ultra Reliable & Low Latency Communication, URLLC), and the system is highly demanded in these scenarios in terms of high reliability, low latency, large broadband and wide coverage.

A hybrid automatic repeat request (Hybrid Automatic Repeat Request, HARQ) process identity may be shared by dynamic grant and configured grant, so there is such a situation that the HARQ process identities for dynamic-grant transmission and configured-grant transmission are the same.

Data buffer of the previous transmission may be stored in a same HARQ process. In a case that the same HARQ process is used for the transmission of different data, the data buffered in the HARQ process may be replaced with new data, and the repetition of the buffered data may be adversely affected.

SUMMARY

An object of the present disclosure is to provide transmission methods and transmission devices, so as to solve the problem that the repetition of the buffered data is adversely affected due to the replacement of the data buffered in the HARQ process with new data in a case that the same HARQ process is used for the transmission of different data.

In one aspect, the present disclosure provides in some embodiments a transmission method for a user equipment (User Equipment, UE), including, in a case that a same first HARQ process is used by a dynamic-grant physical uplink shared channel (Physical Uplink Shared Channel, PUSCH) and a configured-grant PUSCH, transmitting one of the configured-grant PUSCH and the dynamic-grant PUSCH using the first HARQ process, or transmitting the configured-grant PUSCH or the dynamic-grant PUSCH using the first HARQ process and then transmitting the dynamic-grant PUSCH or the configured-grant PUSCH using the first HARQ process.

In another aspect, the present disclosure provides in some embodiments a transmission method for a network side device, including: transmitting first configuration information to a UE, the first configuration information indicating the UE not to use a first HARQ process to transmit a configured-grant PUSCH, indicating the UE to re-determine a transmission time of the configured-grant PUSCH and/or an HARQ process, and indicating the UE to transmit a dynamic-grant PUSCH using the first HARQ process; or transmitting second configuration information to the UE, the second configuration information indicating the UE not to use the first HARQ process to transmit the dynamic-grant PUSCH, and indicating the UE to transmit the configured-grant PUSCH using the first HARQ process.

In yet another aspect, the present disclosure provides in some embodiments a UE, including a processing module configured to, in a case that a same first HARQ process is used by a dynamic-grant PUSCH and a configured-grant PUSCH, transmit one of the configured-grant PUSCH and the dynamic-grant PUSCH using the first HARQ process, or transmit the configured-grant PUSCH or the dynamic-grant PUSCH using the first HARQ process and then transmit the dynamic-grant PUSCH or the configured-grant PUSCH using the first HARQ process.

In still yet another aspect, the present disclosure provides in some embodiments a network side device, including a transmission module configured to: transmit first configuration information to a UE, the first configuration information indicating the UE not to use a first HARQ process to transmit a configured-grant PUSCH, indicating the UE to re-determine a transmission time of the configured-grant PUSCH and/or an HARQ process, and indicating the UE to transmit a dynamic-grant PUSCH using the first HARQ process; or transmit second configuration information to the UE, the second configuration information indicating the UE not to use the first HARQ process to transmit the dynamic-grant PUSCH, and indicating the UE to transmit the configured-grant PUSCH using the first HARQ process.

In still yet another aspect, the present disclosure provides in some embodiments a UE, including a processor, a memory, and a computer program stored in the memory and executed by the processor. The processor is configured to execute the computer program so as to implement the above-mentioned transmission method.

In still yet another aspect, the present disclosure provides in some embodiments a network side device, including a processor, a memory, and a computer program stored in the memory and executed by the processor. The processor is configured to execute the computer program so as to implement the above-mentioned transmission method.

In still yet another aspect, the present disclosure provides in some embodiments a computer-readable storage medium storing therein a computer program. The computer program is executed by a processor so as to implement the above-mentioned transmission method.

As a result, in a case that the same HARQ process is used by the dynamic-grant PUSCH and the configured-grant PUSCH, it is able for the UE to determine how to transmit the dynamic-grant PUSCH and the configured-grant PUSCH, thereby to prevent a behavior of the UE from being confused.

BRIEF DESCRIPTION OF THE DRAWINGS

Through reading the detailed description hereinafter, the other advantages and benefits will be apparent to a person skilled in the art. The drawings are merely used to show the preferred embodiments, but shall not be construed as limiting the present disclosure. In addition, in the drawings, same reference symbols represent same members. In these drawings.

DETAILED DESCRIPTION

Figure 1:
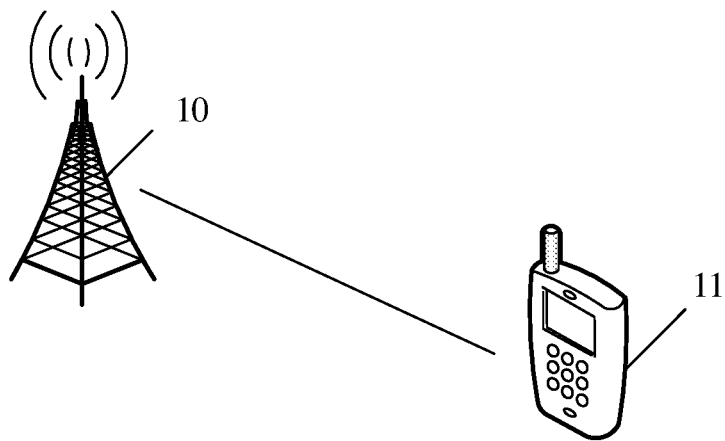
FIG. 1 is a schematic view showing architecture of a wireless communications system according to an embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Such terms as "include" or any other variations involved in the specification and the appended claims of the present disclosure intend to provide non-exclusive coverage, so that a procedure, a method, a system, a product or a device including a series of steps or units may also include any other elements not listed herein, or may include any inherent steps or units of the procedure, method, system, product or device. In addition, the expression "and/or" involved in the specification and the appended claims of the present disclosure are merely used to describe the relationship between objects, and it may include three situations. For example, "A and/or B" may represent that, there is only A, there are both A and B, and there is only B.

Such expressions as "illustrative" and "for example" are merely used to show examples, instances or explanations. Any illustrative embodiment or scheme in the present disclosure shall not be construed as being superior over the other embodiment or scheme. Definitely, these words intend to exhibit relevant concepts in a concrete manner.

In order to understand the scheme in the embodiments of the present disclosure in a better manner, the following two technical terms will be described hereinafter at first.

(1) Configured Grant and Dynamic Grant

With respect to the requirements on a low latency service or a periodic service, NR supports an uplink configured-grant transmission mode, so as to shorten a signaling interaction procedure, and meet the requirements on low latency. Resources for configured-grant transmission may be semi-statically configured through radio resource control (Radio Resource Control, RRC) signaling. In a case that data about a service with a high priority (e.g., a URLLC service) has arrived, a UE may transmit data on a configured-grant uplink channel (e.g., PUSCH).

With respect to a traditional service (e.g., eMBB service data), a base station may transmit a UL dynamic grant through a downlink control channel, and upon the receipt of the UL grant, the UE may transmit data on the dynamic-grant PUSCH in accordance with scheduling information about the UL grant.

(2) HARQ Process Identity (ID)

With respect to uplink transmission, the UE may use a plurality of HARQ processes to reduce a transmission delay. Through the dynamic-grant uplink transmission, an HARQ process ID used for the uplink transmission may be indicated by the UL grant. In a case that the repetition of a same transmission block is scheduled, the HARQ process ID indicated by the UL grant may be the same as an HARQ process ID used for the initial transmission or previous transmission. Hence, prior to the reception of the UL grant for scheduling the repetition, data transmitted previously may be cached in the HARQ process, until the UE confirms that the data has been transmitted successfully or new data needs to be transmitted.

With respect to the configured-grant transmission, the quantity of HARQ processes may be configured through RRC signaling. For a transmission block transmitted through the configured-grant PUSCH, the adopted HARQ process ID may be associated with a transmission time and a configured-grant transmission period.

The present disclosure will be described hereinafter in conjunction with the drawings. A transmission method and a transmission device in the embodiments of the present disclosure may be applied to a wireless communications system. The wireless communications system may be a system using a 5G mobile communication technology (hereinafter referred to as 5G system), an evolved long term evolution (Evolved Long Term Evolution, eLTE) system, or a subsequently evolved communications system. As shown in FIG. 1, which is a schematic view showing architecture of the wireless communications system, the wireless communications system may include a network side device 10 and a UE, e.g., UE 11, which may communicate with the network side device 10. In actual use, the devices may be connected to each other in a wireless manner. A solid line is adopted in FIG. 1 to intuitively show a connection relationship between the devices.

It should be appreciated that, the communications system may include a plurality of UEs, and the network side device may communicate with each of the UEs (transmit signaling or data).

The network side device in the embodiments of the present disclosure may be a base station. The network side device may be a commonly-used base station, an evolved node base station (eNB), or a network side device (e.g., a next generation node base station (gNB) or a transmission and reception point (Transmission and Reception Point, TRP) in the 5G system.

The UE in the embodiments of the present disclosure may be mobile phone, tablet computer, laptop computer, ultra-mobile personal computer (Ultra-Mobile Personal Computer, UMPC), netbook or personal digital assistant (Personal Digital Assistant, PDA).

Figure 2:
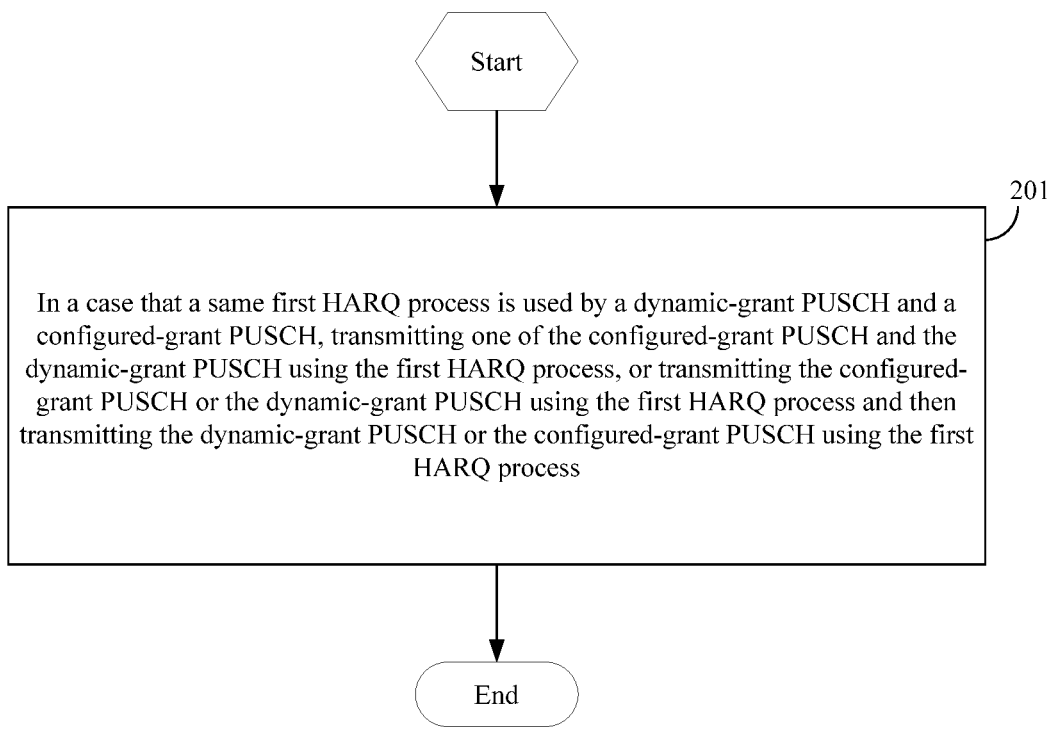
FIG. 2 is a flow chart of a transmission method according to an embodiment of the present disclosure.

As shown in FIG. 2, the present disclosure provides in some embodiments a transmission method implemented by a UE, which includes Step 201 of, in a case that a same first HARQ process is used by a dynamic-grant PUSCH and a configured-grant PUSCH, transmitting one of the configured-grant PUSCH and the dynamic-grant PUSCH using the first HARQ process, or transmitting the configured-grant PUSCH or the dynamic-grant PUSCH using the first HARQ process and then transmitting the dynamic-grant PUSCH or the configured-grant PUSCH using the first HARQ process.

In the embodiments of the present disclosure, in a case that the first HARQ process is used by the dynamic-grant PUSCH and the configured-grant PUSCH, it may be understood as that an HARQ process used by the dynamic-grant PUSCH has a same process ID as an HARQ process used by the configured-grant PUSCH.

In Step 201, the transmitting the configured-grant PUSCH or the dynamic-grant PUSCH using the first HARQ process and then transmitting the dynamic-grant PUSCH or the configured-grant PUSCH using the first HARQ process may include one of: a first mode of transmitting the configured-grant PUSCH using the first HARQ process, flushing data buffered in the first HARQ process after the transmission, and then transmitting the dynamic-grant PUSCH using the first HARQ process; and a second mode of transmitting the dynamic-grant PUSCH using the first HARQ process, flushing data buffered in the first HARQ process after the transmission, and then transmitting the configured-grant PUSCH using the first HARQ process.

Optionally in a possible embodiment of the present disclosure, the dynamic grant may be scrambled using a cell radio network temporary identifier (Cell Radio Network Temporary Identifier, C-RNTI).

As a result, in a case that the first HARQ process is used by the dynamic-grant PUSCH and the configured-grant PUSCH, it is able for the UE to determine how to transmit the dynamic-grant PUSCH and the configured-grant PUSCH, thereby to prevent a behavior of the UE from being confused.

Figure 3:
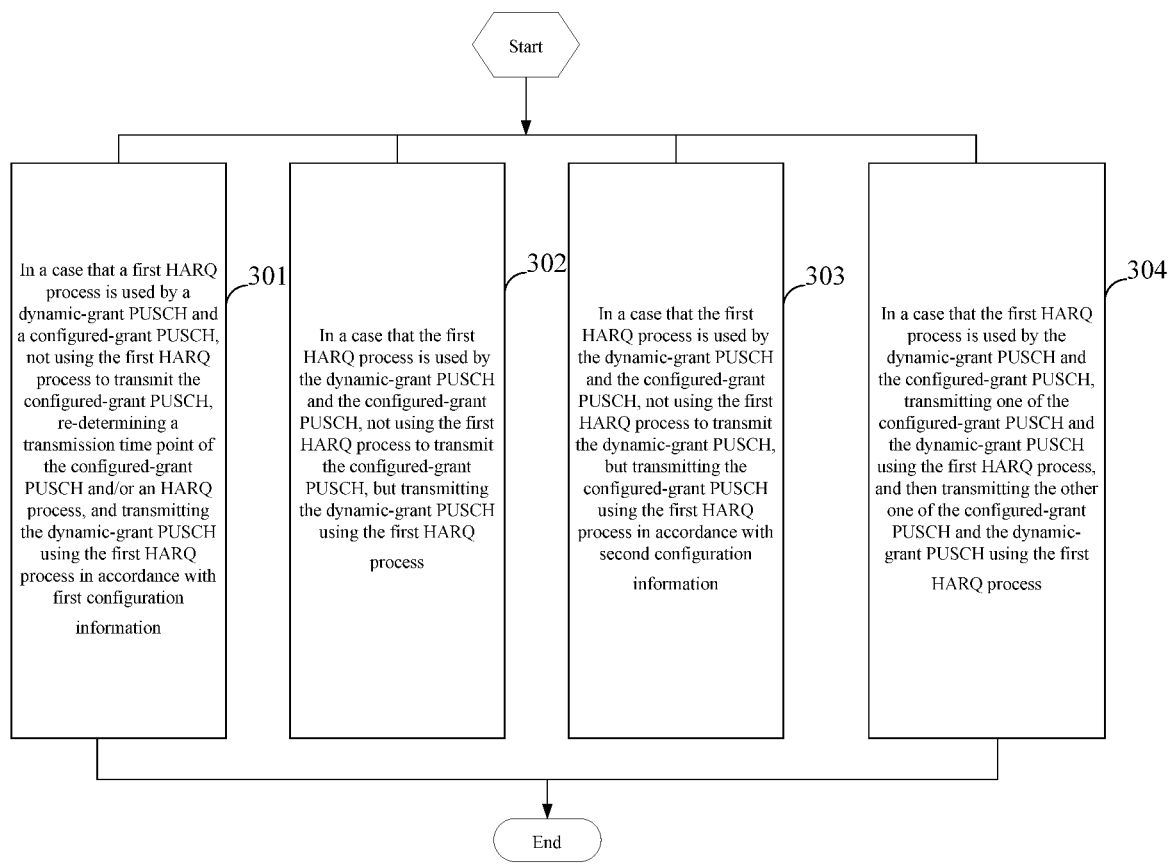
FIG. 3 is another flow chart of the transmission method according to an embodiment of the present disclosure.

As shown in FIG. 3, the present disclosure further provides in some embodiments a transmission method implemented by a UE, which includes the following steps.

Step 301: in a case that a first HARQ process is used by a dynamic-grant PUSCH and a configured-grant PUSCH, not using the first HARQ process to transmit the configured-grant PUSCH, re-determining a transmission time of the configured-grant PUSCH and/or an HARQ process, and transmitting the dynamic-grant PUSCH using the first HARQ process in accordance with first configuration information.

It should be appreciated that, the UE may determine the HARQ process for the configured-grant PUSCH in accordance with the transmission time of the configured-grant PUSCH. It should be further appreciated that, the first configuration information may be received by the UE from a network side device, or may be predefined.

In the embodiments of the present disclosure, the first configuration information has the following effects.

(1) The UE is capable of configuring a first timer in accordance with the first configuration information, and a timer starting time of the first timer may be a dynamic grant reception time or a transmission time of the dynamic-grant PUSCH. Within a time period where the first timer is running, the UE may not be allowed to transmit the configured-grant PUSCH, and a transmission priority of the configured-grant PUSCH may be lower than a transmission priority of the dynamic-grant PUSCH.

(2) The UE is capable of configuring a second timer in accordance with the first configuration information, and a timer starting time of the second timer may be a dynamic grant reception time or the transmission time of the dynamic-grant PUSCH. Within a running time period of the second timer, the UE may not be allowed to transmit a PUSCH with a low logical channel priority.

Step 302: in a case that the first HARQ process is used by the dynamic-grant PUSCH and the configured-grant PUSCH, not using the first HARQ process to transmit the configured-grant PUSCH, and transmitting the dynamic-grant PUSCH using the first HARQ process.

Step 303: not using the first HARQ process to transmit the dynamic-grant PUSCH, and transmitting the configured-grant PUSCH using the first HARQ process in accordance with second configuration information.

It should be appreciated that, the second configuration information may be received by the UE from the network side device, or may be predefined.

In the embodiments of the present disclosure, the second configuration information has the following effects.

(1) The UE is capable of configuring a third timer in accordance with the second configuration information. Within a running time period of the third timer, the dynamic-grant PUSCH may not be transmitted using the first HARQ process. A start time of the third timer may be before the transmission time of the configured-grant PUSCH. Within the running time period of the third timer, the UE may not be allowed to transmit the dynamic-grant PUSCH. A transmission priority of the dynamic-grant PUSCH may be lower than a transmission priority of the configured-grant PUSCH, or a logic channel priority of the dynamic-grant PUSCH may be lower than a logic channel priority of the configured-grant PUSCH.

(2) The UE is capable of configuring a fourth timer in accordance with the second configuration information, and a start time of the fourth timer may be after the transmission time of the configured-grant PUSCH. Within a running time period of the fourth timer, the UE may not be allowed to transmit the dynamic-grant PUSCH. The transmission priority of the dynamic-grant PUSCH may be lower than the transmission priority of the configured-grant PUSCH, or the logic channel priority of the dynamic-grant PUSCH may be lower than the logic channel priority of the configured-grant PUSCH.

(3) The UE is capable of configuring a fifth timer in accordance with the second configuration information. Within a running time period of the fifth timer, the UE may not be allowed to transmit the dynamic-grant PUSCH. A start time of the fifth timer may be the transmission time of the configured-grant PUSCH. The transmission priority of the dynamic-grant PUSCH may be lower than the transmission priority of the configured-grant PUSCH, or the logic channel priority of the dynamic-grant PUSCH may be lower than the logic channel priority of the configured-grant PUSCH.

(4) The UE is capable of configuring a sixth timer in accordance with the second configuration information. Within a running time period of the sixth timer, the UE may not be allowed to transmit the dynamic-grant PUSCH. A start time of the sixth timer may be the transmission time of the configured-grant PUSCH. The transmission priority of the dynamic-grant PUSCH may be lower than the transmission priority of the configured-grant PUSCH, or the logic channel priority of the dynamic-grant PUSCH may be lower than the logic channel priority of the configured-grant PUSCH.

Step 304: in a case that the first HARQ process is used by the dynamic-grant PUSCH and the configured-grant PUSCH, transmitting one of the configured-grant PUSCH and the dynamic-grant PUSCH using the first HARQ process, and then transmitting the other one of the configured-grant PUSCH and the dynamic-grant PUSCH using the first HARQ process.

It should be appreciated that, the UE may perform any one of Steps 301, 302, 303 and 304 according to the practical need.

In a possible embodiment of the present disclosure, Step 301 may include any one of: configuring the first timer in accordance with the first configuration information, abandoning the transmission of the configured-grant PUSCH using the first HARQ process within the time period where the first timer is running, and re-determining the transmission time of the configured-grant PUSCH within a time period where the first timer is stopped; and configuring the first timer in accordance with the first configuration information, abandoning the transmission of the configured-grant PUSCH using the first HARQ process within the time period where the first timer is running, and re-determining the transmission time of the configured-grant PUSCH and an HARQ process within the running time period or stopping time period of the first timer. The timer starting time of the first timer may be the dynamic grant reception time or the transmission time of the dynamic-grant PUSCH. Within the time period where the first timer is running, the UE may not be allowed to transmit the configured-grant PUSCH, and the transmission priority of the configured-grant PUSCH may be lower than the transmission priority of the dynamic-grant PUSCH.

Optionally, in a possible embodiment of the present disclosure, Step 301 may include any one of: in a case that the logic channel priority of the configured-grant PUSCH is higher than the logic channel priority of the dynamic-grant PUSCH, configuring the second timer in accordance with the first configuration information, and transmitting the configured-grant PUSCH using the first HARQ process within the running time period of the second timer; in a case that the logic channel priority of the configured-grant PUSCH is lower than the logic channel priority of the dynamic-grant PUSCH, configuring the second timer in accordance with the first configuration information, and re-determining the transmission time of the configured-grant PUSCH within a stopping time period of the second timer; and in a case that the logic channel priority of the configured-grant PUSCH is lower than the logic channel priority of the dynamic-grant PUSCH, configuring the second timer in accordance with the first configuration information, and re-determining the transmission time of the configured-grant PUSCH and an HARQ process within the running time period or stopping time period of the second timer. The timer starting time of the second timer may be the dynamic grant reception time or the transmission time of the dynamic-grant PUSCH, and within the running time period of the second timer, the UE may not be allowed to transmit a PUSCH with a low logic channel priority.

Optionally, in a possible embodiment of the present disclosure, Step 302 may include any one of: in a case that the transmission time of the configured-grant PUSCH using the first HARQ process is before the transmission time of the dynamic-grant PUSCH and the transmission of the configured-grant PUSCH does not overlap with the transmission of the dynamic-grant PUSCH in a time domain, abandoning the transmission of the configured-grant PUSCH using the first HARQ process, and transmitting the dynamic-grant PUSCH using the first HARQ process; in a case that the transmission time of the configured-grant PUSCH using the first HARQ process is before the transmission time of the dynamic-grant PUSCH and the repetition of the configured-grant PUSCH overlaps with the transmission of the dynamic-grant PUSCH in a time domain, abandoning the transmission of the configured-grant PUSCH using the first HARQ process, and transmitting the dynamic-grant PUSCH using the first HARQ process; and in a case that the transmission time of the configured-grant PUSCH using the first HARQ process is before the transmission time of the dynamic-grant PUSCH and the repetition of the configured-grant PUSCH does not overlap with the transmission of the dynamic-grant PUSCH in a time domain, abandoning the transmission of the configured-grant PUSCH using the first HARQ process, and transmitting the dynamic-grant PUSCH using the first HARQ process.

Optionally, in a possible embodiment of the present disclosure, Step 303 may include one or more of: configuring the third timer in accordance with the second configuration information, and within the running time period of the third timer, not using the first HARQ process to transmit the dynamic-grant PUSCH, the start time of the third timer being before the transmission time of the configured-grant PUSCH, the UE being not allowed to transmit the dynamic-grant PUSCH within the running time period of the third timer, the transmission priority of the dynamic-grant PUSCH being lower than the transmission priority of the configured-grant PUSCH or the logic channel priority of the dynamic-grant PUSCH being lower than the logic channel priority of the configured-grant PUSCH; and configuring the fourth timer in accordance with the second configuration information, and not using the first HARQ process to transmit the dynamic-grant PUSCH within the running time period of the fourth timer, the start time of the fourth timer being after the transmission time of the configured-grant PUSCH, the UE being not allowed to transmit the dynamic-grant PUSCH within the running time period of the fourth timer, the transmission priority of the dynamic-grant PUSCH being lower than the transmission priority of the configured-grant PUSCH or the logic channel priority of the dynamic-grant PUSCH being lower than the logic channel priority of the configured-grant PUSCH.

Optionally, in a possible embodiment of the present disclosure, Step 303 may include, in a case that the transmission time of the configured-grant PUSCH using the first HARQ process is before the transmission time of the dynamic-grant PUSCH, configuring the fifth timer in accordance with the second configuration information, and not using the first HARQ process to transmit the dynamic-grant PUSCH within the running time period of the fifth timer. Within the running time period of the fifth timer, the UE may not be allowed to transmit the dynamic-grant PUSCH, the start time of the fifth timer may be the transmission time of the configured-grant PUSCH, and the transmission priority of the dynamic-grant PUSCH may be lower than the transmission priority of the configured-grant PUSCH or the logic channel priority of the dynamic-grant PUSCH may be lower than the logic channel priority of the configured-grant PUSCH.

Optionally, in a possible embodiment of the present disclosure, Step 304 may include any one of: in a case that the transmission time of the configured-grant PUSCH using the first HARQ process is before the transmission time of the dynamic-grant PUSCH and the transmission of the configured-grant PUSCH does not overlap with the transmission of the dynamic-grant PUSCH in a time domain, transmitting the configured-grant PUSCH using the first HARQ process, flushing data buffered in the HARQ process after the transmission, and transmitting the dynamic-grant PUSCH using the first HARQ process; in a case that the transmission time of the configured-grant PUSCH using the first HARQ process is before the transmission time of the dynamic-grant PUSCH and the repetition of the configured-grant PUSCH overlaps with the transmission of the dynamic-grant PUSCH in a time domain, transmitting the configured-grant PUSCH using the first HARQ process, transmitting the dynamic-grant PUSCH using the first HARQ process at the transmission time of the dynamic-grant PUSCH, and abandoning the repetition of the configured-grant PUSCH using the first HARQ process after the transmission time of the dynamic-grant PUSCH; in a case that the transmission time of the configured-grant PUSCH using the first HARQ process is after the transmission time of the dynamic-grant PUSCH, transmitting the dynamic-grant PUSCH using the first HARQ process, and transmitting the configured-grant PUSCH using the first HARQ process at the transmission time of the configured-grant PUSCH, the transmission priority or logic channel priority of the configured-grant PUSCH being not lower than the transmission priority or logic channel priority of the dynamic-grant PUSCH; and in a case that the transmission time of the configured-grant PUSCH using the first HARQ process is before the transmission time of the dynamic-grant PUSCH, transmitting the dynamic-grant PUSCH using the first HARQ process, and transmitting the configured-grant PUSCH using the first HARQ process at the transmission time of the configured-grant PUSCH, the transmission priority or logic channel priority of the dynamic-grant PUSCH being not lower than the transmission priority or logic channel priority of the configured-grant PUSCH.

As a result, in a case that the same HARQ process is used by the dynamic-grant PUSCH and the configured-grant PUSCH, it is able for the UE to determine how to transmit the dynamic-grant PUSCH and the configured-grant PUSCH, thereby to prevent a behavior of the UE from being confused.

Figure 4:
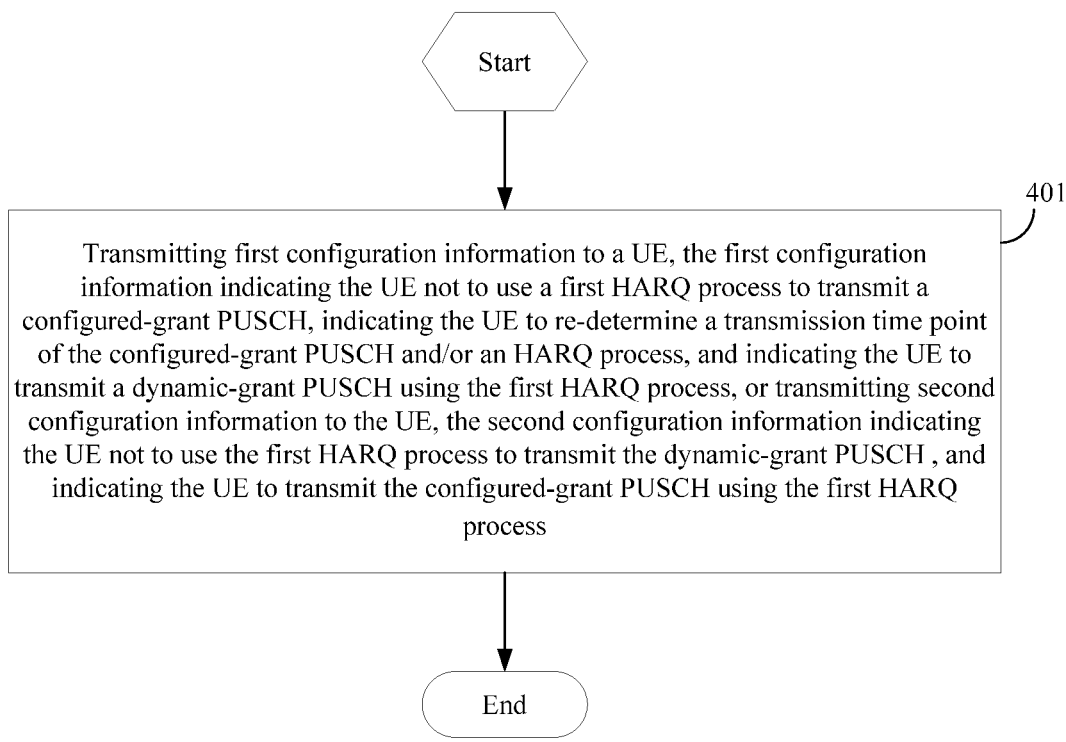
FIG. 4 is a flow chart of another transmission method according to an embodiment of the present disclosure.

As shown in FIG. 4, the present disclosure further provides in some embodiments a transmission method implemented by a network side device, which includes Step 401 of transmitting first configuration information to a UE, the first configuration information indicating the UE not to use a first HARQ process to transmit a configured-grant PUSCH, indicating the UE to re-determine a transmission time of the configured-grant PUSCH and/or an HARQ process, and indicating the UE to transmit a dynamic-grant PUSCH using the first HARQ process, or transmitting second configuration information to the UE, the second configuration information indicating the UE not to use the first HARQ process to transmit the dynamic-grant PUSCH, and indicating the UE to transmit the configured-grant PUSCH using the first HARQ process.

Optionally, in a possible embodiment of the present disclosure, the first configuration information may be used to configure a first timer. Within a time period where the first timer is running, the UE may not be allowed to transmit the configured-grant PUSCH, a timer starting time of the first timer may be a dynamic grant reception time or a transmission time of the dynamic-grant PUSCH, and a transmission priority of the configured-grant PUSCH may be lower than a transmission priority of the dynamic-grant PUSCH.

Optionally, in a possible embodiment of the present disclosure, the first configuration information may be used to configure a second timer, a timer starting time of the second timer may be the dynamic grant reception time or the transmission time of the dynamic-grant PUSCH, and within a running time period of the second timer, the UE may not be allowed to transmit a PUSCH with a low logic channel priority.

Optionally, in a possible embodiment of the present disclosure, the second configuration information may be used to configure a third timer and/or a fourth timer. A start time of the third timer may be before the transmission time of the configured-grant PUSCH, within a running time period of the third timer, the UE may not be allowed to transmit the dynamic-grant PUSCH, and the transmission priority of the dynamic-grant PUSCH may be lower than the transmission priority of the configured-grant PUSCH or a logical channel priority of the dynamic-grant PUSCH may be lower than a logic channel priority of the configured-grant PUSCH. A start time of the fourth timer may be after the transmission time of the configured-grant PUSCH, within a running time period of the fourth timer, the UE may not be allowed to transmit the dynamic-grant PUSCH, and the transmission priority of the dynamic-grant PUSCH may be lower than the transmission priority of the configured-grant PUSCH or the logical channel priority of the dynamic-grant PUSCH may be lower than the logic channel priority of the configured-grant PUSCH.

As a result, in a case that the first HARQ process is used by the dynamic-grant PUSCH and the configured-grant PUSCH, it is able for the UE to determine how to transmit the dynamic-grant PUSCH and the configured-grant PUSCH, thereby to prevent a behavior of the UE from being confused.

In the following scenarios, the UE may receive uplink dynamic-grant signaling within an $n^{th}$ time unit, and the uplink dynamic-grant signaling may be used to schedule the transmission of a PUSCH within an $(n+x)^{th}$ time unit using an HARQ process with HPID=i.

Scenario #1

Example #1: the UE needs to transmit data within an $(n+t1)^{th}$ time unit on a configured-grant PUSCH, an HARQ process identity corresponding to the configured-grant PUSCH transmitted at the time is HPID=i and x<1.

Optionally, in a possible embodiment of the present disclosure, if a timer0 having a length of T has been configured by a network, the UE may not be allowed to transmit the configured-grant PUSCH within a running time period of the timer0, i.e., the UE may not transmit the configured-grant PUSCH using the HARQ process with HPID=i within the running time period of the timer0.

It should be appreciated that, the above time unit may be slot, subframe or symbol.

Further, the UE may receive a dynamic grant within the $n^{th}$ time unit, and start or reset the timer0. The UE may not transit the configured-grant PUSCH using the HARQ process with HPID=i from the $n^{th}$ time unit to an $(n+T)^{th}$ time unit.

Figure 5:
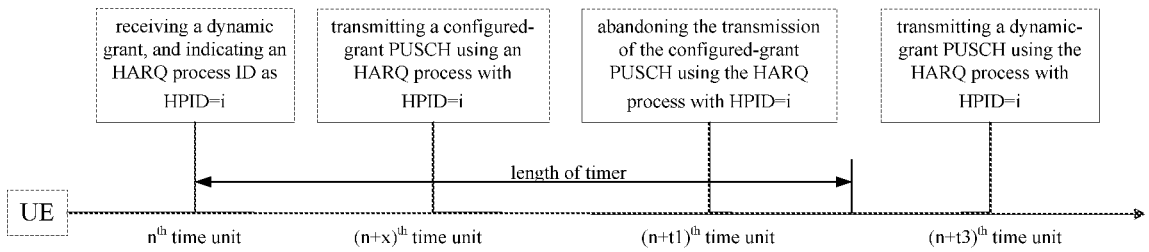
FIG. 5 is a schematic view showing the transmission of a dynamic-grant PUSCH and a configured-grant PUSCH according to an embodiment of the present disclosure.

As shown in FIG. 5, the UE may abandon the transmission of the configured-grant PUSCH within the $(n+t1)^{th}$ time unit, where t1<T. The UE may re-determine that the configured-grant PUSCH is to be transmitted using the HARQ process with HPID=i within an $(n+t2)^{th}$ time unit, where t2>T.

Figure 6:
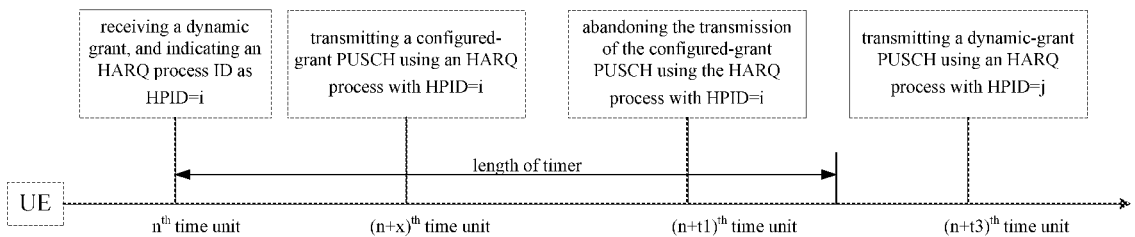
FIG. 6 is another schematic view showing the transmission of the dynamic-grant PUSCH and the configured-grant PUSCH according to an embodiment of the present disclosure.

Alternatively, as shown in FIG. 6, the UE may re-determine that the transmission time of the configured-grant PUSCH is a next valid configured-grant transmission time. For example, the configured-grant PUSCH may be transmitted within an $(n+t3)^{th}$ time unit using an HARQ process with HPID=j, where j≠i, t3≤T or t3>T.

Example #2: after the transmission of the dynamic-grant PUSCH within the $(n+x)^{th}$ time unit, the UE may start or reset the timer0. The UE may not transmit the configured-grant PUSCH using the HARQ process with HPID=i from the $(n+x)^{th}$ time unit to an $(n+x+T)^{th}$ time unit.

Optionally, in a possible embodiment of the present disclosure, the UE may abandon the transmission of the configured-grant PUSCH within the $(n+t1)^{th}$ time unit, where t1<x+T.

Further, the UE may re-determine that the configured-grant PUSCH is to be transmitted using the HARQ process with HPID=i within the $(n+t2)^{th}$ time unit, where t2>x+T; or the UE may re-determine that the transmission time of the configured-grant PUSCH is a next valid configured-grant transmission time. For example, the PUSCH may be transmitted using the HARQ process with HPID=j within the $(n+t3)^{th}$ time unit, where j≠i, t3≤x+T or t3>x+T.

Scenario #2

Example #1: the UE needs to transmit data within an $(n+t1)^{th}$ time unit on a configured-grant PUSCH, an HARQ process identity corresponding to the configured-grant PUSCH transmitted at the time is HPID=i and x<t1.

If a timer0 having a length of T has been configured by a network and the UE is not allowed to transmit a PUSCH with a low logic channel priority within a running time period of the timer0, the UE may transmit the configured-grant PUSCH whose logic channel priority is higher than a logic channel priority of the dynamic-grant PUSCH using the HARQ process with HPID=i within the running time period of the timer0. In addition, the UE may not be allowed to transmit the configured-grant PUSCH whose logic channel priority is lower than the logic channel priority of the dynamic-grant PUSCH using the HARQ process with HPID=i within the running time period of the timer0.

Optionally, in a possible embodiment of the present disclosure, the UE may receive a dynamic grant within the $n^{th}$ time unit, and start or reset the timer0.

Further, in a case that the logic channel priority of the configured-grant PUSCH is lower than the logic channel priority of the dynamic-grant PUSCH, the UE may not transmit the configured-grant PUSCH using the HARQ process with HPID=i from the $n^{th}$ time unit to an $(n+T)^{th}$ time unit.

Further, the UE may abandon the transmission of the configured-grant PUSCH within the $(n+t1)^{th}$ time unit, where t1<T. The UE may re-determine that the configured-grant PUSCH is to be transmitted using the HARQ process with HPID=i within an $(n+t2)^{th}$ time unit, where t2>T, or re-determine that the transmission time of the configured-grant PUSCH is a next valid configured-grant transmission time. For example, the PUSCH may be transmitted within an $(n+t3)^{th}$ time unit using an HARQ process with HPID=j, where j≠i, t3≤T or t3>T.

In a case that the logic channel priority of the configured-grant PUSCH is not lower than the logic channel priority of the dynamic-grant PUSCH, the UE may flush data buffered in the HARQ process with HPID=i, and transmit the configured-grant PUSCH using the HARQ process with HPID=i within the $(n+t1)^{th}$ time unit.

Optionally, in a possible embodiment of the present disclosure, after the transmission of the dynamic-grant PUSCH within the $(n+x)^{th}$ time unit, the UE may start or reset the timer0.

Further, in a case that the logic channel priority of the configured-grant PUSCH is lower than the logic channel priority of the dynamic-grant PUSCH, the UE may not transmit the configured-grant PUSCH using the HARQ process with HPID=i from the $(n+x)^{th}$ time unit to an $(n+x+T)^{th}$ time unit.

Further, the UE may abandon the transmission of the configured-grant PUSCH within the $(n+t1)^{th}$ time unit, where t1<T.

Optionally, in a possible embodiment of the present disclosure, the UE may re-determine that the configured-grant PUSCH is to be transmitted using the HARQ process with HPID=i within an $(n+t2)^{th}$ time unit, where t2>x+T.

Optionally, in a possible embodiment of the present disclosure, the UE may re-determine that the transmission time of the configured-grant PUSCH is a next valid configured-grant transmission time. For example, the PUSCH may be transmitted within an $(n+t3)^{th}$ time unit using an HARQ process with HPID=j, where j≠i, t3≤T or t3>T.

In a case that the logic channel priority of the configured-grant PUSCH is not lower than the logic channel priority of the dynamic-grant PUSCH, the UE may flush data buffered in the HARQ process with HPID=i, and transmit the configured-grant PUSCH using the HARQ process with HPID=i within the $(n+t1)^{th}$ time unit.

Scenario #3

Example #1: the UE needs to transmit data within an $(n+t1)^{th}$ time unit on a configured-grant PUSCH, an HARQ process identity corresponding to the configured-grant PUSCH transmitted at the time is HPID=i and x<t1.

If a timer1 having a length of T1 and/or a timer2 having a length of T2 have been configured by a network, the UE may not be allowed to transmit the dynamic-grant PUSCH within a running time period of the timer1. The transmission priority of the dynamic-grant PUSCH may be lower than the transmission priority of the configured-grant PUSCH, or the logic channel priority of the dynamic-grant PUSCH may be lower than the logic channel priority of the configured-grant PUSCH.

Within a running time period of the timer2, the UE may not be allowed to transmit the dynamic-grant PUSCH. The transmission priority of the dynamic-grant PUSCH may be lower than the transmission priority of the configured-grant PUSCH, or the logic channel priority of the dynamic-grant PUSCH may be lower than the logic channel priority of the configured-grant PUSCH.

Optionally, in a possible embodiment of the present disclosure, the UE may start the timer1 before the $(n+t1)^{th}$ time unit for transmitting the configured-grant PUSCH, and omit or abandon the transmission of the dynamic-grant PUSCH using the HARQ process with HPID=i from an $(n+t1-T1)^{th}$ time unit to an $(n+t1-1)^{th}$ time unit; and/or the UE may start the timer2 after the $(n+t1)^{th}$ time unit for transmitting the configured-grant PUSCH, and omit or abandon the transmission of the dynamic-grant PUSCH using the HARQ process with HPID=i from an $(n+t1+1)^{th}$ time unit to an $(n+t1+T2)^{th}$ time unit.

Optionally, in a possible embodiment of the present disclosure, in a case that the timer1 and/or the timer2 are configured in accordance with the logic channel priority, the UE may not be allowed to transmit a PUSCH with a low logic channel priority within the running time period of the timer1 and/or the timer2.

Optionally, in a possible embodiment of the present disclosure, the UE may start the timer1 before the $(n+t1)^{th}$ time unit for transmitting the configured-grant PUSCH, and omit or abandon the dynamic-grant PUSCH whose logic channel priority is lower than the logic channel priority of the configured-grant PUSCH using the HARQ process with HPID=i from the $(n+t1-T1)^{th}$ time unit to the $(n+t1-1)^{th}$ time unit; and/or the UE may start the timer2 after the $(n+t1)^{th}$ time unit for transmitting the configured-grant PUSCH, and omit or abandon the dynamic-grant PUSCH whose logic channel priority is lower than the logic channel priority of the configured-grant PUSCH using the HARQ process with HPID=i from the $(n+t1+1)^{th}$ time unit to the $(n+t1+T2)^{th}$ time unit.

Scenario #4

Example #1: the UE needs to transmit data within a slot n+t1 on the configured-grant PUSCH, an HARQ process identity corresponding to the configured-grant PUSCH transmitted at the time is HPID=i and x>t1.

Example #1-1: the UE may transmit the configured-grant PUSCH from an $(n+t1)^{th}$ time unit at repetition times of N=1.

Optionally, in a possible embodiment of the present disclosure, in a case that a timer3 has been configured by a network, the UE may start or reset the timer3 upon the receipt of a dynamic grant within an $n^{th}$ time unit.

Figure 7:
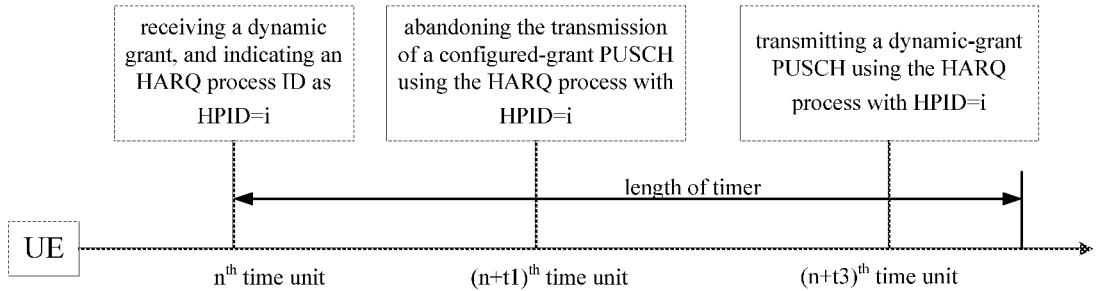
FIG. 7 is yet another schematic view showing the transmission of the dynamic-grant PUSCH and the configured-grant PUSCH according to an embodiment of the present disclosure.

In a case that the UE is not allowed to transmit the configured-grant PUSCH within a running time period of the timer3, or in a case that the UE is not allowed to transmit a PUSCH with a low logic channel priority within the running time period of the timer3 and the logic channel priority of the configured-grant PUSCH is lower than the logic channel priority of the dynamic-grant PUSCH, the UE may abandon the transmission of the configured-grant PUSCH using the HARQ process with HPID=i within the $(n+t1)^{th}$ time unit, and transmit the dynamic-grant PUSCH using the HARQ process with HPID=i within an $(n+x)^{th}$ time unit, as shown in FIG. 7.

In a case that the UE is not allowed to transmit the PUSCH with a low logic channel priority within the running time period of the timer3 and the logic channel priority of the configured-grant PUSCH is not lower than the logic channel priority of the dynamic-grant PUSCH, the UE may transmit the configured-grant PUSCH using the HARQ process with HPID=i within the $(n+t1)^{th}$ time unit, and abandon the transmission of the dynamic-grant PUSCH using the HARQ process with HPID=i within the $(n+x)^{th}$ time unit.

Optionally, in a possible embodiment of the present disclosure, in a case that a timer4 has been configured by the network, the UE may start or reset the timer4 upon the transmission of the dynamic-grant PUSCH within the $(n+x)^{th}$ time unit.

Figure 8:
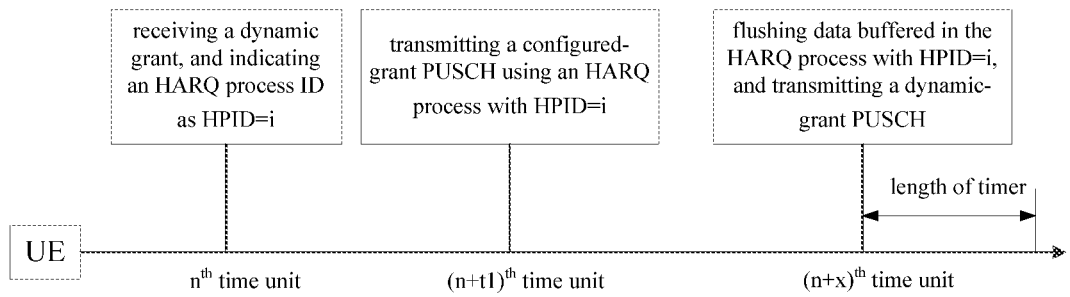
FIG. 8 is still yet another schematic view showing the transmission of the dynamic-grant PUSCH and the configured-grant PUSCH according to an embodiment of the present disclosure.

In a case that the UE is not allowed to transmit the configured-grant PUSCH within a running time period of the timer4, or in a case that the UE is not allowed to transmit a PUSCH with a low logic channel priority within the running time period of the timer4 and the logic channel priority of the configured-grant PUSCH is lower than the logic channel priority of the dynamic-grant PUSCH, the UE may transmit the configured-grant PUSCH using the HARQ process with HPID=i within the $(n+t1)^{th}$ time unit, as shown in FIG. 8. Subsequent to the transmission of the configured-grant PUSCH, the UE may flush data buffered in the HARQ process with HPID=i, and transmit the dynamic-grant PUSCH using the HARQ process with HPID=i within the $(n+x)^{th}$ time unit.

In a case that the UE is not allowed to transmit the PUSCH with a low logic channel priority within the running time period of the timer4 and the logic channel priority of the configured-grant PUSCH is not lower than the logic channel priority of the dynamic-grant PUSCH, the UE may abandon the transmission of the dynamic-grant PUSCH using the HARQ process with HPID=i within the $(n+x)^{th}$ time unit.

Figure 9:
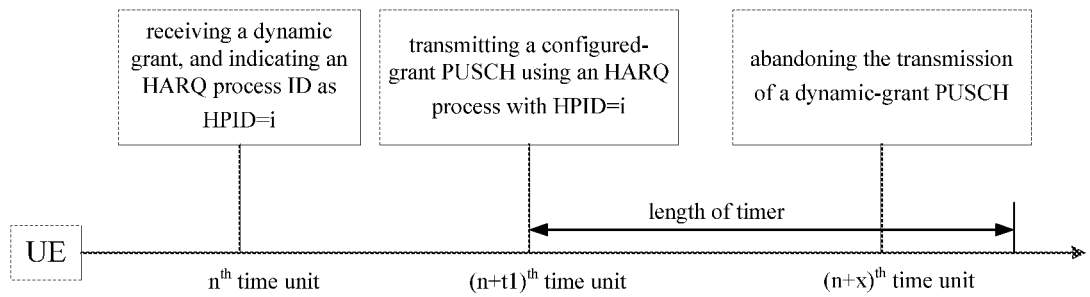
FIG. 9 is still yet another schematic view showing the transmission of the dynamic-grant PUSCH and the configured-grant PUSCH according to an embodiment of the present disclosure.

As shown in FIG. 9, in a case that a timer5 for configured grant has been configured by the network and the UE is not allowed to transmit the dynamic-grant PUSCH within a running time period of the timer5, the UE may abandon the transmission of the dynamic-grant PUSCH using the HARQ process with HPID=i within the $(n+x)^{th}$ time unit.

Example #1-2: the UE may transmit the configured-grant PUSCH from the $(n+t1)^{th}$ time unit at repetition times of N>1.

In a case that the repetition times N of the transmission of the configured-grant PUSCH from the $(n+t1)^{th}$ time unit is greater than 1, the UE may repeat the configured-grant PUSCH from the $(n+t1)^{th}$ time unit to an $(n+t1+N-1)^{th}$ time unit, and the $(n+t1+N-1)^{th}$ time unit may be a time unit where the configured-grant PUSCH is repeated for the last time. In a case that t1<x<t1+N-1, the UE may abandon the repetition of the configured-grant PUSCH using the HARQ process with HPID=i from the $(n+t1)^{th}$ time unit to the $(n+t1+N-1)^{th}$ time unit, and transmit the dynamic-grant PUSCH using the HARQ process with HPID=i within the $(n+x)^{th}$ time unit; or the UE may repeat the dynamic-grant PUSCH with HPID=i from the $(n+t1)^{th}$ time unit to an $(n+x-1)^{th}$ time unit, transmit the dynamic-grant PUSCH using the HARQ process with HPID=i within the $(n+x)^{th}$ time unit, and abandon the repetition of the configured-grant PUSCH using the HARQ process with HPID=i from the $(n+x)^{th}$ time unit to the $(n+t1+N-1)^{th}$ time unit. The transmission priority or logic channel priority of the dynamic-grant PUSCH may be not lower than that of the configured-grant PUSCH.

Alternatively, in a case that a timer6 having a length of T6 for configured grant has been configured by the network and the UE is not allowed to transmit the dynamic-grant PUSCH within a running time period of the timer6, the UE may repeat the configured-grant PUSCH using the HARQ process with HPID=i from the $(n+t1)^{th}$ time unit to the $(n+t1+N-1)^{th}$ time unit. In a case that the timer6 is currently operating within the $(n+x)^{th}$ time unit, the UE may abandon the transmission of the dynamic-grant PUSCH using the HARQ process with HPID=i within the $(n+x)^{th}$ time unit.

In a case that the repetition times N of the transmission of the configured-grant PUSCH from the $(n+t1)^{th}$ time unit is greater than 1, the UE may repeat the configured-grant PUSCH from the $(n+t1)^{th}$ time unit to the $(n+t1+N-1)^{th}$ time unit, and the $(n+t1+N-1)^{th}$ time unit may be a time unit where the configured-grant PUSCH is repeated for the last time. In a case that x>t1+N-1, the UE may abandon the repetition of the configured-grant PUSCH using the HARQ process with HPID=i from the $(n+t1)^{th}$ time unit to the $(n+t1+N-1)^{t}$ time unit, and transmit the dynamic-grant PUSCH using the HARQ process with HPID=i within the $(n+x)^{th}$ time unit; or the UE may repeat the configured-grant PUSCH using the HARQ process with HPID=i from the $(n+t1)^{th}$ time unit to the $(n+t1+N-1)^{th}$ time unit, flush data buffered in the HARQ process with HPID=i after the transmission, and transmit the dynamic-grant PUSCH using the HARQ process with HPID=i within the $(n+x)^{th}$ time unit. The transmission priority or logic channel priority of the dynamic-grant PUSCH may be not lower than that of the configured-grant PUSCH.

Alternatively, in a case that a timer7 having a length of T7 for configured grant has been configured by the network and the UE is not allowed to transmit the dynamic-grant PUSCH within a running time period of the timer7, the UE may repeat the configured-grant PUSCH using the HARQ process with HPID=i from the $(n+t1)^{th}$ time unit to the $(n+t1+N-1)^{th}$ time unit. In a case that the timer7 is currently operating within the $(n+x)^{th}$ time unit, the UE may abandon the transmission of the dynamic-grant PUSCH using the HARQ process with HPID=i within the $(n+x)^{th}$ time unit.

Scenario #5

In this scenario, the UE needs to transmit data on the configured-grant PUSCH within an $(n+t1)^{th}$ time unit, an HARQ process corresponding to the configured-grant PUSCH transmitted at this time may be HPID=j, where j≠i and x>t1.

Optionally, in a possible embodiment of the present disclosure, in a case that the repetition times N of the transmission of the configured-grant PUSCH from the $(n+t1)^{th}$ time unit is 1, the UE may perform processings in accordance with procedures known in the art.

Optionally, in a possible embodiment of the present disclosure, in a case that the repetition times N of the transmission of the configured-grant PUSCH from the $(n+t1)^{th}$ time unit is greater than 1, the UE may repeat the configured-grant PUSCH from the $(n+t1)^{th}$ time unit to the $(n+t1+N)^{th}$ time unit, and the $(n+t1+N)^{th}$ time unit may be a time unit where the configured-grant PUSCH is repeated for the last time. In a case that t1<x<t1+N, the UE my transmit the dynamic-grant PUSCH using the HARQ process with HPID=i within the $(n+x)^{th}$ time unit, abandon the repetition of the configured-grant PUSCH within the $(n+x)^{th}$ time unit, and continue to repeat the configured-grant PUSCH after the $(n+x)^{th}$ time unit.

Figure 10:
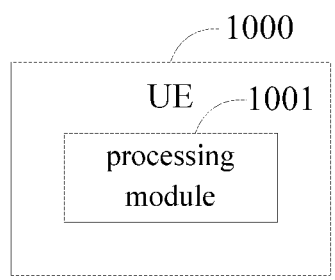
FIG. 10 is a schematic view showing a UE according to an embodiment of the present disclosure.

As shown in FIG. 10, the present disclosure further provides in some embodiments a UE 1000 which includes a processing module 1001 configured to, in a case that a same first HARQ process is used by a dynamic-grant PUSCH and a configured-grant PUSCH, transmit one of the configured-grant PUSCH and the dynamic-grant PUSCH using the first HARQ process, or transmit the configured-grant PUSCH or the dynamic-grant PUSCH using the first HARQ process and then transmit the dynamic-grant PUSCH or the configured-grant PUSCH using the first HARQ process.

Optionally, in a possible embodiment of the present disclosure, the processing module 1001 is further configured to, in accordance with first configuration information, not use the first HARQ process to transmit the configured-grant PUSCH, reselect a transmission time of the configured-grant PUSCH and/or an HARQ process, and transmit the dynamic-grant PUSCH using the first HARQ process; or not use the first HARQ process to transmit the configured-grant PUSCH, and transmit the dynamic-grant PUSCH using the first HARQ process; or in accordance with second configuration information, not use the first HARQ process to transmit the dynamic-grant PUSCH, and transmit the configured-grant PUSCH using the first HARQ process.

Optionally, in a possible embodiment of the present disclosure, the processing module 1001 is further configured to: configure a first timer in accordance with the first configuration information, abandon the transmission of the configured-grant PUSCH using the first HARQ process within a time period where the first timer is running, and reselect the transmission time of the configured-grant PUSCH within a time period where the first timer is stopped; or configure the first timer in accordance with the first configuration information, abandon the transmission of the configured-grant PUSCH using the first HARQ process within the time period where the first timer is running, and reselect the transmission time of the configured-grant PUSCH and an HARQ process within the running time period or stopping time period of the first timer. A timer starting time of the first timer may be a dynamic grant reception time or a transmission time of the dynamic-grant PUSCH, the UE may not be allowed to transmit the configured-grant PUSCH within the time period where the first timer is running, and a transmission priority of the configured-grant PUSCH may be lower than a transmission priority of the dynamic-grant PUSCH.

Optionally, in a possible embodiment of the present disclosure, the processing module 1001 is further configured to perform any one of: in a case that a logic channel priority of the configured-grant PUSCH is higher than a logic channel priority of the dynamic-grant PUSCH, configuring a second timer in accordance with the first configuration information, and transmitting the configured-grant PUSCH using the first HARQ process within a running time period of the second timer; in a case that the logic channel priority of the configured-grant PUSCH is lower than the logic channel priority of the dynamic-grant PUSCH, configuring the second timer in accordance with the first configuration information, and reselecting the transmission time of the configured-grant PUSCH within a stopping time period of the second timer; and in a case that the logic channel priority of the configured-grant PUSCH is lower than the logic channel priority of the dynamic-grant PUSCH, configuring the second timer in accordance with the first configuration information, and reselecting the transmission time of the configured-grant PUSCH and an HARQ process within the running time period or stopping time period of the second timer. A timer starting time of the second timer may be the dynamic grant reception time or the transmission time of the dynamic-grant PUSCH, and the UE may not be allowed to transmit a PUSCH with a low logic channel priority within the running time period of the second timer.

Optionally, in a possible embodiment of the present disclosure, the processing module 1001 is further configured to: configure a third timer in accordance with the second configuration information, and not use the first HARQ process to transmit the dynamic-grant PUSCH within a running time period of the third timer, a start time of the third timer being before the transmission time of the configured-grant PUSCH, the UE 1000 being not allowed to transmit the dynamic-grant PUSCH within the running time period of the third timer, and the transmission priority of the dynamic-grant PUSCH being lower than the transmission priority of the configured-grant PUSCH or the logic channel priority of the dynamic-grant PUSCH being lower than the logic channel priority of the configured-grant PUSCH; and/or configure a fourth timer in accordance with the second configuration information, and not use the first HARQ process to transmit the dynamic-grant PUSCH within a running time period of the fourth timer, a start time of the fourth timer being after the transmission time of the configured-grant PUSCH, the UE 1000 being not allowed to transmit the dynamic-grant PUSCH within the running time period of the fourth timer, and the transmission priority of the dynamic-grant PUSCH being lower than the transmission priority of the configured-grant PUSCH or the logic channel priority of the dynamic-grant PUSCH being lower than the logic channel priority of the configured-grant PUSCH.

Optionally, in a possible embodiment of the present disclosure, the processing module 1001 is further configured to: in a case that the transmission time of the configured-grant PUSCH using the first HARQ process is before the transmission time of the dynamic-grant PUSCH and the transmission of the configured-grant PUSCH does not overlap with the transmission of the dynamic-grant PUSCH in a time domain, abandon the transmission of the configured-grant PUSCH using the first HARQ process, and transmit the dynamic-grant PUSCH using the first HARQ process; or in a case that the transmission time of the configured-grant PUSCH using the first HARQ process is before the transmission time of the dynamic-grant PUSCH and the repetition of the configured-grant PUSCH overlaps with the transmission of the dynamic-grant PUSCH in a time domain, abandon the transmission of the configured-grant PUSCH using the first HARQ process, and transmit the dynamic-grant PUSCH using the first HARQ process.

Optionally, in a possible embodiment of the present disclosure, the processing module 1001 is further configured to: in a case that the transmission time of the configured-grant PUSCH using the first HARQ process is before the transmission time of the dynamic-grant PUSCH and the transmission of the configured-grant PUSCH does not overlap with the transmission of the dynamic-grant PUSCH in a time domain, transmit the configured-grant PUSCH using the first HARQ process, flush data buffered in the HARQ process after the transmission, and then transmit the dynamic-grant PUSCH using the first HARQ process; or in a case that the transmission time of the configured-grant PUSCH using the first HARQ process is before the transmission time of the dynamic-grant PUSCH and the repetition of the configured-grant PUSCH overlaps with the transmission of the dynamic-grant PUSCH in a time domain, transmit the configured-grant PUSCH using the first HARQ process, transmit the dynamic-grant PUSCH using the first HARQ process at the transmission time of the dynamic-grant PUSCH, and abandon the repetition of the configured-grant PUSCH using the same HARQ process after the transmission of the dynamic-grant PUSCH.

Optionally, in a possible embodiment of the present disclosure, the processing module 1001 is further configured to: in a case that the transmission time of the configured-grant PUSCH using the first HARQ process is after the transmission time of the dynamic-grant PUSCH, transmit the dynamic-grant PUSCH using the first HARQ process, and then transmit the configured-grant PUSCH using the first HARQ process at the transmission time of the configured-grant PUSCH, the transmission priority or logic channel priority of the configured-grant PUSCH being not lower than the transmission priority or logic channel priority of the dynamic-grant PUSCH; or in a case that the transmission time of the configured-grant PUSCH using the first HARQ process is before the transmission time of the dynamic-grant PUSCH, transmit the dynamic-grant PUSCH using the first HARQ process, and then transmit the configured-grant PUSCH using the first HARQ process at the transmission time of the configured-grant PUSCH, the transmission priority or logic channel priority of the dynamic-grant PUSCH being not lower than the transmission priority or logic channel priority of the configured-grant PUSCH.

Optionally, in a possible embodiment of the present disclosure, the processing module 1001 is further configured to, in a case that the transmission time of the configured-grant PUSCH using the first HARQ process is before the transmission time of the dynamic-grant PUSCH, configure a fifth timer in accordance with the second configuration information, and not use the first HARQ process to transmit the dynamic-grant PUSCH within a running time period of the fifth timer. The UE may not be allowed to transmit the dynamic-grant PUSCH within the running time period of the fifth timer, and the transmission priority of the dynamic-grant PUSCH may be lower than the transmission priority of the configured-grant PUSCH or the logic channel priority of the dynamic-grant PUSCH may be lower than the logic channel priority of the configured-grant PUSCH.

Figure 11:
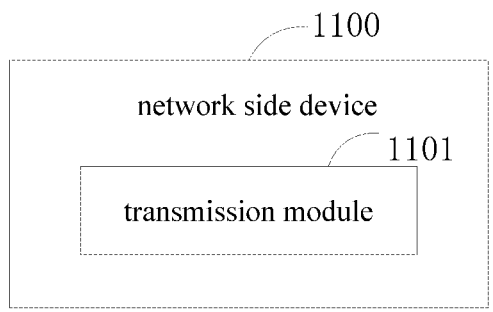
FIG. 11 is a schematic view showing a network side device according to an embodiment of the present disclosure.

As shown in FIG. 11, the present disclosure further provides in some embodiments a network side device 1100 which includes a transmission module 1101 configured to: transmit first configuration information to a UE, the first configuration information indicating the UE not to use a first HARQ process to transmit a configured-grant PUSCH, indicating the UE to re-determine a transmission time of the configured-grant PUSCH and/or an HARQ process, and indicating the UE to transmit a dynamic-grant PUSCH using the first HARQ process; or transmit second configuration information to the UE, the second configuration information indicating the UE not to use the first HARQ process to transmit the dynamic-grant PUSCH, and indicating the UE to transmit the configured-grant PUSCH using the first HARQ process.

Optionally, in a possible embodiment of the present disclosure, the first configuration information may be used to configure a first timer. Within a time period where the first timer is running, the UE may not be allowed to transmit the configured-grant PUSCH, a timer starting time of the first timer may be a dynamic grant reception time or a transmission time of the dynamic-grant PUSCH, and a transmission priority of the configured-grant PUSCH may be lower than a transmission priority of the dynamic-grant PUSCH.

Optionally, in a possible embodiment of the present disclosure, the first configuration information may be used to configure a second timer, a timer starting time of the second timer may be the dynamic grant reception time or the transmission time of the dynamic-grant PUSCH, and within a running time period of the second timer, the UE may not be allowed to transmit a PUSCH with a low logic channel priority.

Optionally, in a possible embodiment of the present disclosure, the second configuration information may be used to configure a third timer and/or a fourth timer. A start time of the third timer may be before the transmission time of the configured-grant PUSCH, within a running time period of the third timer, the UE may not be allowed to transmit the dynamic-grant PUSCH, and the transmission priority of the dynamic-grant PUSCH may be lower than the transmission priority of the configured-grant PUSCH or a logical channel priority of the dynamic-grant PUSCH may be lower than a logic channel priority of the configured-grant PUSCH. A start time of the fourth timer may be after the transmission time of the configured-grant PUSCH, within a running time period of the fourth timer, the UE may not be allowed to transmit the dynamic-grant PUSCH, and the transmission priority of the dynamic-grant PUSCH may be lower than the transmission priority of the configured-grant PUSCH or the logical channel priority of the dynamic-grant PUSCH may be lower than the logic channel priority of the configured-grant PUSCH.

Figure 12:
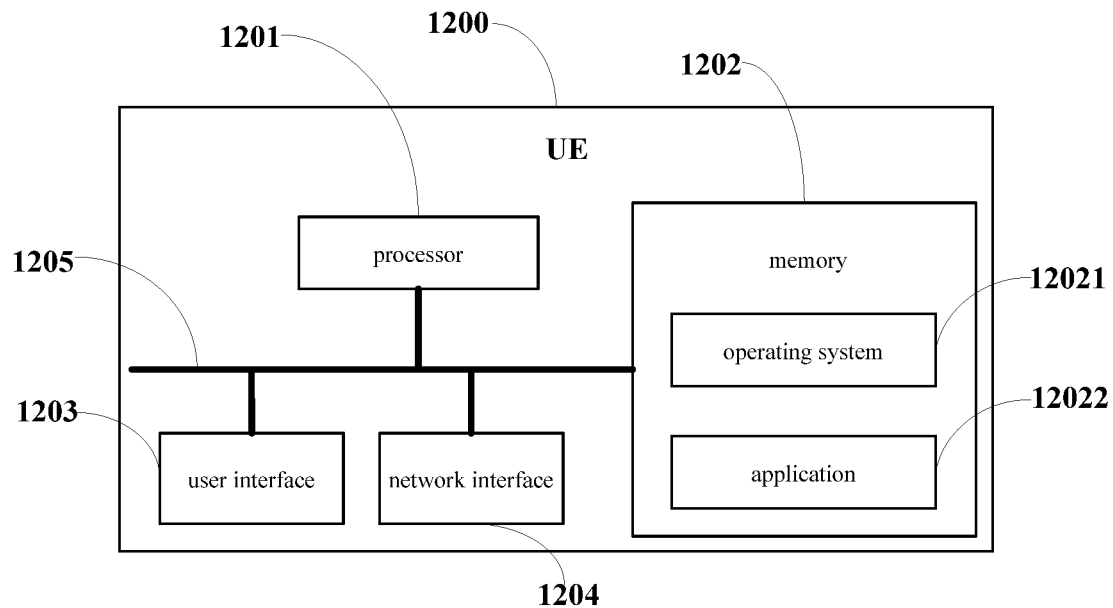
FIG. 12 is another schematic view showing the UE according to an embodiment of the present disclosure.

As shown in FIG. 12, the present disclosure further provides in some embodiments a UE 1200, which includes at least one processor 1201, a memory 1202, a user interface 103 and at least one network interface 1204. Components of the UE 1200 may be coupled together through a bus stem 1205.

It should be appreciated that, the bus system 1205 is configured to achieve connection and communication among the components. Apart from a data bus, the bus system 1205 may further include a power source bus, a control bus and a state signal bus. For clarification, all these buses in FIG. 12 may be collectively called as bus system 1205.

The user interface 1203 may include a display, a keyboard or a pointing device (e.g., mouse, track ball, touch plate or touch panel).

It should be appreciated that, the memory 1202 may be a volatile memory, a nonvolatile memory or both. The non-volatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM) or a flash memory. The volatile memory may be a random access memory (Random Access Memory, RAM) which serves as an external high-speed cache. Illustratively and non-restrictively, the RAM may include static RAM (Static RAM, SRAM), Dynamic RAM (dynamic RAM, DRAM), synchronous DRAM (Synchronous DRAM, SDRAM), double data rate SDRAM (Double Data Rate SDRAM, DDRSDRAM), enhanced SDRAM (Enhanced SDRAM, ESDRAM), synchronous link DRAM (Synchronous Link DRAM, SLDRAM) or direct rambus RAM (Direct Rambus RAM, DRRAM). The memory 1202 intends to include, and not limited to, the above-mentioned and any other appropriate memories.

In a possible embodiment of the present disclosure, the following elements may be stored in the memory 1202: an executable module or data structure, a subset or an extended set thereof, an operating system 12021 and an application 12022.

The operating system 12021 may include various system programs, e.g., a framework layer, a core layer and a driving layer, so as to implement various basic services and process hardware-based tasks. The application 12022 may include various applications, e.g., media player and browser, so as to implement various application services. The programs for implementing the above-mentioned method may be included in the application 12022.

In the embodiments of the present disclosure, the UE 1200 may further include a computer program stored in the memory 1202 and executed by the processor 1201. The computer program is executed by the processor 1201 so as to implement the above-mentioned method.

The above-mentioned method may be applied to, or implemented by, the processor 1201. The processor 1201 may be an integrated circuit having a signal processing capability. During the implementation, the steps of the above-mentioned method may be completed through an integrated logic circuit of hardware in the processor 1201 or instructions in the form of software. The processor 1201 may be a general-purpose processor, a digital signal processor, an application-specific integrated circuit (Application-Specific Integrated Circuit, ASIC), a field programmable gate array (Field Programmable Gate Array, FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known computer-readable storage medium such as an RAM, a flash memory, an ROM, a PROM, an EEPROM, or a register. The computer-readable storage medium may be located in the memory 1202, and the processor 1201 may read information stored in the memory 1202 so as to implement the steps of the method in conjunction with the hardware. To be specific, a computer program may be stored in the computer-readable storage medium.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSP Device, DSPD), a programmable logic device (Programmable Logic Device, PLD), a field programmable gate array (Field Programmable Gate Array, FPGA), a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

Figure 13:
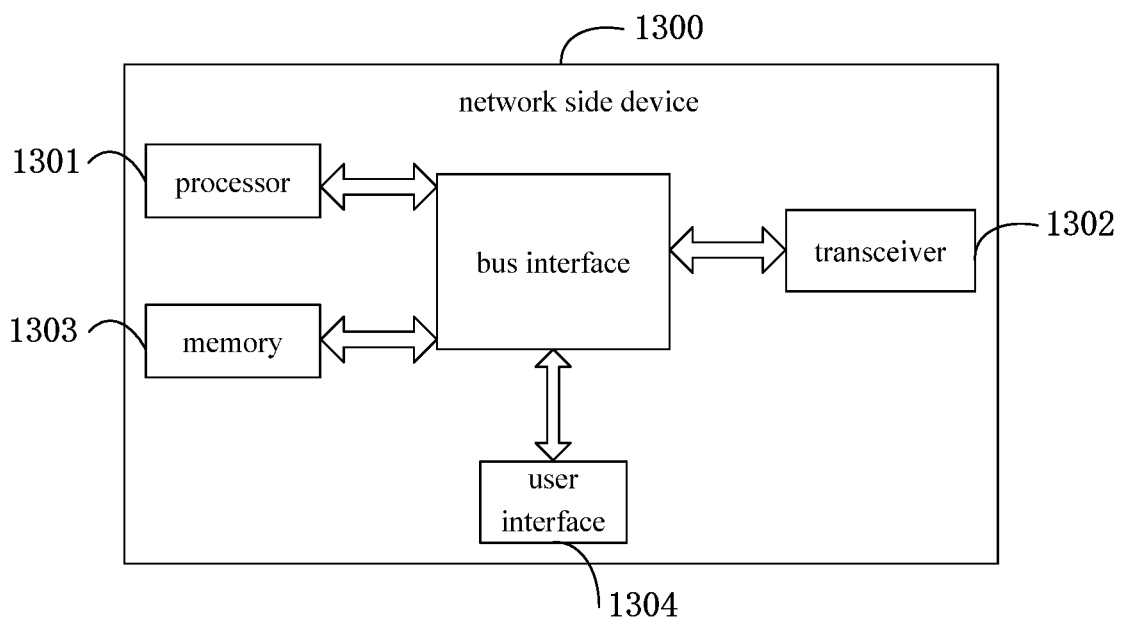
FIG. 13 is another schematic view showing the network side device according to an embodiment of the present disclosure.

As shown in FIG. 13, the present disclosure further provides in some embodiments a network side device 1300 which includes a processor 1301, a transceiver 1302, a memory 1303, a user interface 1304 and a bus interface.

The processor 1301 may take charge of managing bus architecture as well as general processings. The memory 1303 may store therein data for the operation of the processor 1301.

In the embodiments of the present disclosure, the network side device 1300 may further include a computer program stored in the memory 1303 and executed by the processor 1301. The computer program is executed by the processor 1301 so as to implement the above-mentioned method.

In FIG. 13, bus architecture may include a number of buses and bridges connected to each other, so as to connect various circuits for one or more processors 1301 and one or more memories 1303. In addition, as is known in the art, the bus architecture may be used to connect any other circuits, such as a circuit for a peripheral device, a circuit for a voltage stabilizer and a power management circuit, which will not be particularly defined herein. The bus interface may be provided, and the transceiver 1302 may consist of a plurality of elements, i.e., a transmitter and a receiver for communication with any other devices over a transmission medium. With respect to different UEs, the user interface 1304 may also be provided for devices which are to be arranged inside or outside the UE, and these devices may include but not limited to a keypad, a display, a speaker, a microphone and a joystick.

The steps of the methods or algorithm described in conjunction with the contents mentioned hereinabove may be implemented through hardware, or implemented by a processor executing instructions. The instructions may consist of corresponding modules stored in an RAM, a flash memory, an ROM, an EPROM, an EEPROM, a register, a hard disk, a mobile hard disk, a read-only optic disk, or any other known storage medium. Illustratively, the storage medium may be coupled to the processor, so that the processor is capable of reading information from the storage medium and writing information into the storage medium. Of course, the storage medium may be a component of the processor. The processor and the storage medium may be located in an ASIC. In addition, the ASIC may be located in an interface device of a core network. Of course, the processor and the storage medium may be located in the interface device of the core network as discrete assemblies.

It should be appreciated that, the functions described in one or more embodiments of the present disclosure may be achieved through hardware, software, firmware or a combination thereof. In a case that the functions are achieved through software, these functions may be stored in the computer-readable medium or transmitted as one or more instructions or codes on the computer-readable medium. The computer-readable medium may include a computer-readable storage medium and a communication medium. The communication medium may include any medium capable of transmitting a computer program from one place to another place. The storage medium may include any available medium capable of being accessed by a general-purpose or dedicated computer.

The objects, the technical solutions and the beneficial effects of the present disclosure have been described hereinabove in details. It should be appreciated that, the above description may be for illustrative purposes only, but shall not be used to limit the scope of the present disclosure. Any modifications, equivalents or improvements shall also fall within the scope of the present disclosure.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, compact disc-read only memory (Compact Disc-Read Only Memory, CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A transmission method performed by a User Equipment (UE), the transmission method comprising:
in a case that a same first Hybrid Automatic Repeat Request (HARQ) process is used by a dynamic-grant Physical Uplink Shared Channel (PUSCH) and a configured-grant PUSCH,
transmitting one of the configured-grant PUSCH and the dynamic-grant PUSCH using the first HARQ process,
wherein the transmitting one of the configured-grant PUSCH and the dynamic-grant PUSCH using the first HARQ process comprises:
not using the first HARQ process to transmit the configured-grant PUSCH, re-determining a transmission time of the configured-grant PUSCH and/or an HARQ process, and transmitting the dynamic-grant PUSCH using the first HARQ process in accordance with first configuration information,
wherein not using the first HARQ process to transmit the configured-grant PUSCH and re-determining the transmission time of the configured-grant PUSCH and/or the HARQ process in accordance with the first configuration information comprises at least one of:
configuring a first timer in accordance with the first configuration information, abandoning the transmission of the configured-grant PUSCH using the first HARQ process within a time period where the first timer is running, and re-determining the transmission time of the configured-grant PUSCH within a time period where the first timer is stopped;
configuring the first timer in accordance with the first configuration information, abandoning the transmission of the configured-grant PUSCH using the first HARQ process within the time period where the first timer is running, and re-determining the transmission time of the configured-grant PUSCH and an HARQ process within the running time period or stopping time period of the first timer;
in a case that a logic channel priority of the configured-grant PUSCH is higher than a logic channel priority of the dynamic-grant PUSCH, configuring a second timer in accordance with the first configuration information, and transmitting the configured-grant PUSCH using the first HARQ process within a running time period of the second timer;
in a case that the logic channel priority of the configured-grant PUSCH is lower than the logic channel priority of the dynamic-grant PUSCH, configuring the second timer in accordance with the first configuration information, and re-determining the transmission time of the configured-grant PUSCH within a stopping time period of the second timer; or in a case that the logic channel priority of the configured-grant PUSCH is lower than the logic channel priority of the dynamic-grant PUSCH, configuring the second timer in accordance with the first configuration information, and re-determining the transmission time of the configured-grant PUSCH and an HARQ process within the running time period or stopping time period of the second timer, wherein a timer starting time of the first timer is a dynamic grant reception time or a transmission time of the dynamic-grant PUSCH, the UE is not allowed to transmit the configured-grant PUSCH within the time period where the first timer is running, and a transmission priority of the configured-grant PUSCH is lower than a transmission priority of the dynamic-grant PUSCH;

wherein a timer starting time of the second timer is the dynamic grant reception time or the transmission time of the dynamic-grant PUSCH, and the UE is not allowed to transmit a PUSCH with a low logic channel priority within the running time period of the second timer.

2. A transmission method performed by a network side device, the transmission method comprising:
transmitting first configuration information to a User Equipment (UE), the first configuration information indicating the UE not to use a first Hybrid Automatic Repeat Request (HARQ) process to transmit a configured-grant Physical Uplink Shared Channel (PUSCH), indicating the UE to re-determine a transmission time of the configured-grant PUSCH and/or an HARQ process, and indicating the UE to transmit a dynamic-grant PUSCH using the first HARQ process in accordance with first configuration information,
wherein the first configuration information is further configured to indicate the UE to do at least one of:
configuring a first timer in accordance with the first configuration information, abandoning the transmission of the configured-grant PUSCH using the first HARQ process within a time period where the first timer is running, and re-determining the transmission time of the configured-grant PUSCH within a time period where the first timer is stopped;
configuring the first timer in accordance with the first configuration information, abandoning the transmission of the configured-grant PUSCH using the first HARQ process within the time period where the first timer is running, and re-determining the transmission time of the configured-grant PUSCH and an HARQ process within the running time period or stopping time period of the first timer;
in a case that a logic channel priority of the configured-grant PUSCH is higher than a logic channel priority of the dynamic-grant PUSCH, configuring a second timer in accordance with the first configuration information, and transmitting the configured-grant PUSCH using the first HARQ process within a running time period of the second timer;
in a case that the logic channel priority of the configured-grant PUSCH is lower than the logic channel priority of the dynamic-grant PUSCH, configuring the second timer in accordance with the first configuration information, and re-determining the transmission time of the configured-grant PUSCH within a stopping time period of the second timer; or in a case that the logic channel priority of the configured-grant PUSCH is lower than the logic channel priority of the dynamic-grant PUSCH, configuring the second timer in accordance with the first configuration information, and re-determining the transmission time of the configured-grant PUSCH and an HARQ process within the running time period or stopping time period of the second timer, wherein a timer starting time of the first timer is a dynamic grant reception time or a transmission time of the dynamic-grant PUSCH, the UE is not allowed to transmit the configured-grant PUSCH within the time period where the first timer is running, and a transmission priority of the configured-grant PUSCH is lower than a transmission priority of the dynamic-grant PUSCH;

wherein a timer starting time of the second timer is the dynamic grant reception time or the transmission time of the dynamic-grant PUSCH, and the UE is not allowed to transmit a PUSCH with a low logic channel priority within the running time period of the second timer.

3. The transmission method according to claim 2, wherein the first configuration information is used to configure a first timer, within a time period where the first timer is running, the UE is not allowed to transmit the configured-grant PUSCH, a timer starting time of the first timer is a dynamic grant reception time or a transmission time of the dynamic-grant PUSCH, and a transmission priority of the configured-grant PUSCH is lower than a transmission priority of the dynamic-grant PUSCH.

4. The transmission method according to claim 2, wherein the first configuration information is used to configure a second timer, a timer starting time of the second timer is the dynamic grant reception time or the transmission time of the dynamic-grant PUSCH, and within a running time period of the second timer, the UE is not allowed to transmit a PUSCH with a low logic channel priority.

5. A User Equipment (UE), comprising a processor, a memory, and a computer program stored in the memory and executed by the processor, wherein the computer program is executed by the processor so as to implement a transmission method performed by the UE, the transmission method comprising:
in a case that a same first Hybrid Automatic Repeat Request (HARQ) process is used by a dynamic-grant Physical Uplink Shared Channel (PUSCH) and a configured-grant PUSCH,
transmitting one of the configured-grant PUSCH and the dynamic-grant PUSCH using the first HARQ process,
wherein the transmitting one of the configured-grant PUSCH and the dynamic-grant PUSCH using the first HARQ process comprises:
not using the first HARQ process to transmit the configured-grant PUSCH, re-determining a transmission time of the configured-grant PUSCH and/or an HARQ process, and transmitting the dynamic-grant PUSCH using the first HARQ process in accordance with first configuration information,
wherein not using the first HARQ process to transmit the configured-grant PUSCH and re-determining the transmission time of the configured-grant PUSCH and/or the HARQ process in accordance with the first configuration information comprises at least one of:

configuring a first timer in accordance with the first configuration information, abandoning the transmission of the configured-grant PUSCH using the first HARQ process within a time period where the first timer is running, and re-determining the transmission time of the configured-grant PUSCH within a time period where the first timer is stopped;

configuring the first timer in accordance with the first configuration information, abandoning the transmission of the configured-grant PUSCH using the first HARQ process within the time period where the first timer is running, and re-determining the transmission time of the configured-grant PUSCH and an HARQ process within the running time period or stopping time period of the first timer;

in a case that a logic channel priority of the configured-grant PUSCH is higher than a logic channel priority of the dynamic-grant PUSCH, configuring a second timer in accordance with the first configuration information, and transmitting the configured-grant PUSCH using the first HARQ process within a running time period of the second timer;

in a case that the logic channel priority of the configured-grant PUSCH is lower than the logic channel priority of the dynamic-grant PUSCH, configuring the second timer in accordance with the first configuration information, and re-determining the transmission time of the configured-grant PUSCH within a stopping time period of the second timer; or in a case that the logic channel priority of the configured-grant PUSCH is lower than the logic channel priority of the dynamic-grant PUSCH, configuring the second timer in accordance with the first configuration information, and re-determining the transmission time of the configured-grant PUSCH and an HARQ process within the running time period or stopping time period of the second timer, wherein a timer starting time of the first timer is a dynamic grant reception time or a transmission time of the dynamic-grant PUSCH, the UE is not allowed to transmit the configured-grant PUSCH within the time period where the first timer is running, and a transmission priority of the configured-grant PUSCH is lower than a transmission priority of the dynamic-grant PUSCH;

wherein a timer starting time of the second timer is the dynamic grant reception time or the transmission time of the dynamic-grant PUSCH, and the UE is not allowed to transmit a PUSCH with a low logic channel priority within the running time period of the second timer.

6. A network side device, comprising a processor, a memory, and a computer program stored in the memory and executed by the processor, wherein the computer program is executed by the processor so as to implement the transmission method according to claim 2.

7. The network side device according to claim 6, wherein the first configuration information is used to configure a first timer, within a time period where the first timer is running, the UE is not allowed to transmit the configured-grant PUSCH, a timer starting time of the first timer is a dynamic grant reception time or a transmission time of the dynamic-grant PUSCH, and a transmission priority of the configured-grant PUSCH is lower than a transmission priority of the dynamic-grant PUSCH.

8. The network side device according to claim 6, wherein the first configuration information is used to configure a second timer, a timer starting time of the second timer is the dynamic grant reception time or the transmission time of the dynamic-grant PUSCH, and within a running time period of the second timer, the UE is not allowed to transmit a PUSCH with a low logic channel priority.

9. A non-transitory computer readable storage medium, wherein the non-transitory computer readable storage medium stores a computer program therein, and when the computer program is executed by a processor of a User Equipment (UE), the steps of the transmission method according to claim 1 are performed.

10. A non-transitory computer readable storage medium, wherein the non-transitory computer readable storage medium stores a computer program therein, and when the computer program is executed by a processor of a network side device, the steps of the transmission method according to claim 2 are performed.

\* \* \* \* \*